(12) United States Patent
Morishima

(10) Patent No.: US 8,043,387 B2
(45) Date of Patent: Oct. 25, 2011

(54) POSITIVE ELECTRODE FOR NONAQUEOUS ELECTROLYTE SECONDARY BATTERY, AND PRODUCTION METHOD THEREOF

(75) Inventor: Hideki Morishima, Moriguchi (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 13/149,060

(22) Filed: May 31, 2011

(65) Prior Publication Data

US 2011/0229631 A1 Sep. 22, 2011

Related U.S. Application Data

(62) Division of application No. 12/029,941, filed on Feb. 12, 2008.

(30) Foreign Application Priority Data

Feb. 13, 2007 (JP) ................................. 2007-031859

(51) Int. Cl.
*H01M 10/38* (2006.01)
*H01M 10/40* (2006.01)
*H01M 4/50* (2010.01)
*H01M 4/52* (2010.01)

(52) U.S. Cl. .................... 29/623.1; 427/126.6; 429/223; 429/224; 429/231.3

(58) Field of Classification Search ................ 427/126.6
See application file for complete search history.

(56) References Cited

U.S. PATENT DOCUMENTS

| 2006/0115730 A1 | 6/2006 | Taniguchi et al. |
| 2006/0275667 A1 | 12/2006 | Watanabe et al. |
| 2007/0122338 A1 | 5/2007 | Park et al. |
| 2009/0181296 A1* | 7/2009 | Lampe-Onnerud et al. .. 429/160 |

FOREIGN PATENT DOCUMENTS

| JP | 09-306546 A | 11/1997 |
| JP | 2004-127694 A | 4/2004 |
| JP | 2005-317499 A | 11/2005 |

* cited by examiner

*Primary Examiner* — John S Maples
(74) *Attorney, Agent, or Firm* — Westerman, Hattori, Daniels & Adrian, LLP

(57) ABSTRACT

A production method for a positive electrode for a nonaqueous electrolyte secondary battery that includes a positive electrode active material capable of intercalating and deintercalating a lithium ion, a conductive agent and a binder, in which the positive electrode active material is produced by coating cobalt-based lithium composite oxide represented by a general formula: $Li_aCO_{1-s}M1_sO_2$ with lithium nickel cobalt manganese oxide of general formula: $Li_bNi_tCO_uMn_vO_2$, ratio $r_1/r_2$ of the average particle diameter $r_1$ of the cobalt-based lithium composite oxide and the average particle diameter $r_2$ of the lithium nickel cobalt manganese oxide being $2 \leq r_1/r_2 \leq 50$, and the average particle diameter $r_2$ of the lithium nickel cobalt manganese oxide is $0.5 \, \mu m \leq r_2 \leq 20 \, \mu m$. A positive electrode produced by such method results in a nonaqueous electrolyte secondary battery having enhanced energy density and capacity and retention characteristic when charging/discharging is repeated at a high potential of 4.5 V based on lithium.

2 Claims, 1 Drawing Sheet

POSITIVE ELECTRODE FOR NONAQUEOUS ELECTROLYTE SECONDARY BATTERY, AND PRODUCTION METHOD THEREOF

INCORPORATED-BY-REFERENCE TO RELATED APPLICATIONS

This application is a divisional application of U.S. Ser. No. 12/029,941, filed Feb. 12, 2008, which is based upon and claims the benefit of priority from the prior Japanese Patent Application No. 2007-031859, filed on Feb. 13, 2007, the entire contents of which are incorporated by reference.

BACKGROUND

1. Technical Field

The present invention relates to a positive electrode for a nonaqueous electrolyte secondary battery and a production method thereof. Particularly, the present invention relates to a positive electrode for a nonaqueous electrolyte secondary battery using a plurality of positive electrode active materials having different physical properties, which has excellent retention characteristics in a charged state, and is capable of enhancing the capacity and energy density; and a production method thereof.

2. Related Art

With the rapid spread of portable electronic equipment, the specifications required of the batteries used in such equipment have become more stringent every year, and there is particular requirement for batteries that are compact and thin, have high capacity and superior cycling characteristics, and give stable performance. In the field of secondary batteries, attention is focusing on lithium nonaqueous electrolyte secondary batteries, which have high energy density compared with other batteries. These lithium nonaqueous electrolyte secondary batteries are winning an increasingly large share of the secondary battery market.

Here, in an instrument in which such a type of the nonaqueous electrolyte secondary battery is used, since a space in which the battery is held is prismatic (plane box-shaped) in many cases, a prismatic nonaqueous electrolyte secondary battery produced by holding a power element in a prismatic outer can is frequently used. The constitution of such a prismatic nonaqueous electrolyte secondary battery is described with reference to the drawings.

FIG. 1 is a perspective view showing a related-art prismatic nonaqueous electrolyte secondary battery by sectioning the battery perpendicularly. This nonaqueous electrolyte secondary battery 10 is produced by holding a plate wound electrode assembly 14 produced by winding a positive electrode 11, a separator 13 and a negative electrode 12 which are laminated in this order, in the inside of a prismatic battery outer can 15, and by sealing the battery outer can 15 with an opening-sealing plate 16. The wound electrode assembly 14 is wound so that for example, the positive electrode 11 is positioned in the outermost periphery and exposed. The exposed positive electrode 11 in the outermost periphery is directly contacted with the inside of the battery outer can 15 serving also as a positive electrode terminal and is electrically connected. Further, the negative electrode 12 is formed in the center of the opening-sealing plate 16 and is electrically connected to a negative electrode terminal 18 provided through an insulator 17, through a current collector 19.

Further, since the outer can 15 is electrically connected with the positive electrode 11, in order to prevent the short circuit of the negative electrode 12 with the battery outer can 15, an insulating spacer 20 is inserted between the upper terminal of the wound electrode assembly 14 and the opening-sealing plate 16 so that the negative electrode 12 and the battery outer can 15 are in an electrically insulated state to each other. The positions of the positive electrode 11 and the negative electrode 12 are sometimes exchanged with each other. This prismatic nonaqueous electrolyte secondary battery is produced by inserting the wound electrode assembly 14 into the battery outer can 15; by laser-welding the opening-sealing plate 16 to an opening of the battery outer can 15; by pouring a nonaqueous electrolyte through an electrolyte pouring pore 21; and by sealing the electrolyte pouring pore 21. With such a prismatic nonaqueous electrolyte secondary battery, not only is the waste of the space during the use thereof small, but also the excellent advantageous effects of high battery performance and reliability of the battery are exhibited.

As a negative electrode active material used in the nonaqueous electrolyte secondary battery, carbonaceous materials such as graphite and an amorphous carbon are widely used, since carbonaceous materials have such excellent performance such as high safety because lithium dendrites do not grow therein while they have a discharge potential comparable to that of lithium metal or lithium alloy; excellent initial efficiency; advantageous potential flatness; and high density.

Further, as a nonaqueous solvent of a nonaqueous electrolyte, carbonates, lactones, ethers and esters are used individually or in combination of two or more thereof. Among them, particularly carbonates having a large dielectric constant and having high ion conductivity thus the nonaqueous electrolyte thereof are frequently used.

On the other hand, as a positive electrode active material, lithium transition-metal compound oxide such as lithium cobalt oxide ($LiCoO_2$), lithium nickel oxide ($LiNiO_2$), lithium manganese oxide ($LiMnO_2$), spinel-type lithium manganese oxide ($LiMn_2O_4$) and lithium iron oxide ($LiFeO_2$) is used, because it is known that by using such a positive electrode in combination with a negative electrode composed of a carbon material, a 4-V-class nonaqueous secondary battery having a high energy density can be obtained. Among them, particularly because of more excellent battery performance than those of other materials, lithium cobalt oxide and different metal elements-added lithium cobalt oxide are frequently used, however, since not only is cobalt expensive, but also the existing amount of cobalt as a resource is small, for continuous use of lithium cobalt oxide as a positive electrode active material of the nonaqueous electrolyte secondary battery, it is desired to make the nonaqueous electrolyte secondary battery have even higher performance and longer life.

For making the nonaqueous electrolyte secondary battery in which lithium cobalt oxide is used as a positive electrode active material, having even higher performance and longer life, it is an essential task to enhance the capacity and energy density of the battery and improve the safety of the battery. Among them, as a method for enhancing the capacity of the battery, enhancing the density of an electrode material, making a current collector and a separator thinner, and enhance the charging voltage of the battery, are generally known. Among them, enhancing the charging voltage of the battery is a useful technology as a method capable of realizing the enhancing of the capacity without changing the constitution of the battery and is an essential technology for enhancing the capacity and the energy density of the battery.

For example, in a nonaqueous electrolyte secondary battery using the lithium-containing transition metal oxide such as lithium cobalt oxide as a positive electrode active material and using a carbon material as a negative electrode active material, when the positive electrode is used in combination with a negative electrode active material of a carbon material such as graphite, the charging voltage is generally 4.1 to 4.2 V, while the potential of the positive electrode active material is 4.2 to 4.3 V based on lithium. Under such a charging condition, the capacity of the positive electrode is utilized in only 50 to 60% relative to a theoretical capacity. Therefore, when the charging voltage can be enhanced more, the capacity of the positive electrode can be utilized in 70% or more relative to the theoretical capacity and enhancing the capacity and energy density of the battery becomes capable.

For example, JP-A-9-306546 discloses an invention of a positive electrode for a nonaqueous electrolyte secondary battery by which enhancing the capacity and energy density of the nonaqueous electrolyte secondary battery was contemplated by enabling high density charging through the use of two types of positive electrode active material having differing average particle diameters and through the use of composite particles produced by coating the surface of a positive electrode active material having the larger average particle diameter among the above different average particle diameters with a positive electrode active material having the smaller average particle diameter. Further, JP-A-2004-127694 discloses an invention of a positive electrode for a nonaqueous electrolyte secondary battery by which enhancing the capacity and energy density of the nonaqueous electrolyte secondary battery was contemplated by causing a high density charging to be able through using composite particles produced by coating the surface of a $LiNiAlO_2$-based positive electrode active material having a larger average particle diameter with a $LiNiCoMnO_2$-based positive electrode active material having a smaller average particle diameter.

On the other hand, JP-A-2005-317499 discloses an invention of a nonaqueous electrolyte secondary battery using a mixture of lithium cobalt oxide and layer-shaped lithium nickel cobalt manganese oxide to which a different metal element is added as a positive electrode active material, and capable of being stably charged at a high charging voltage. This positive electrode active material is produced so that by adding different metal elements of at least Zr, Mg to lithium cobalt oxide, the structural stability thereof at a high voltage (to 4.5 V) is improved and further, by incorporating layer-shaped lithium nickel cobalt manganese oxide having high thermal stability at a high voltage, the safety is secured. By using a combination of a positive electrode using the above positive electrode active material and a negative electrode having a negative electrode active material composed of a carbon material, a nonaqueous electrolyte secondary battery capable of being stably charged at a high charging voltage of 4.3 V or more and 4.5 V or less (the final positive electrode charging voltage is 4.4 V or more and 4.6 V or less based on lithium), has been obtained.

As described above, various improvements for enhancing the capacity and the energy density of the nonaqueous electrolyte secondary battery containing lithium cobalt oxide as a positive electrode active material have been performed. However, in the inventions of the positive electrode for the nonaqueous electrolyte secondary battery disclosed in JP-A-9-306546 and JP-A-2004-127694, there is such a problem that since a positive electrode active material having a smaller average particle diameter has a large reactivity, that the positive electrode active material having a smaller average particle diameter is selectively deteriorated earlier during charging/discharging, so that not only does the battery blister occur due to the generation of a gas, but also the deterioration of the cycle performance is large.

Further, according to the invention disclosed in JP-A-2005-317499, there is such a problem that particularly in a high charging voltage region, though the deterioration of lithium nickel cobalt manganese oxide is small, the deterioration of lithium cobalt oxide to which a different metal element is added is rapidly deteriorated, so that like the above description, not only does the battery blister occur due to the generation of a gas, but also the deterioration of the cycle performance is large.

SUMMARY

The present inventor has made extensive and intensive studies toward solving the above problems accompanying the background art. As a result, it has been found that by selectively coating an active material likely to be deteriorated in the positive electrode active material with an active material unlikely to be deteriorated, the reactivity of the surface of the active material likely to be deteriorated can be suppressed and as a result, a positive electrode for a nonaqueous electrolyte secondary battery exhibiting an advantageous charging/discharging cycle performance by reducing the generation of a gas without causing the deterioration of other battery properties and capable of achieving the enhancing of the capacity and energy density of the battery can be obtained. Based on these findings, the present invention has been completed.

In other words, an advantage of some aspects of the invention is to provide a positive electrode for a nonaqueous electrolyte secondary battery in which by using a plurality of positive electrode active materials having different physical properties, the structural deterioration of the positive electrode active material is small even when the charging/discharging is repeated at a high potential of 4.5 V based on lithium, and not only is the preserving property in a charged state excellent, but also the enhancing of the capacity and the energy density can be achieved; and a production method thereof.

A positive electrode for a nonaqueous electrolyte secondary battery according to an aspect of the invention is a positive electrode for a nonaqueous electrolyte secondary battery using a positive electrode active material mixture containing a positive electrode active material capable of intercalating and deintercalating a lithium ion, a conductive agent and a binder, in which the positive electrode active material is produced by coating the surface of particles of cobalt-based lithium composite oxide represented by a general formula: $Li_aCO_{1-s}M1_sO_2$ (where $0 \leq a \leq 1.1$, $0.01 \leq s \leq 0.05$, M1 contains at least one of Mg, Al, Zr, and Ti) with particles of lithium nickel cobalt manganese oxide represented by a general formula: $Li_bNi_tCO_uMn_vO_2$ (where composition ratios are $0 \leq b \leq 1.2$, $0.1 \leq t \leq 0.5$, $u \geq 0$, $0.1 \leq v \leq 0.5$), a ratio $r_1/r_2$ of an average particle diameter $r_1$ of the cobalt-based lithium composite oxide and an average particle diameter $r_2$ of the lithium nickel cobalt manganese oxide is $2 \leq r_1/r_2 \leq 50$, and the average particle diameter $r_2$ of the lithium nickel cobalt manganese oxide is $0.5 \ \mu m \leq r_2 \leq 20 \ \mu m$.

The "average particle diameter" as used herein means the value of "$D_{50}$" in a volume distribution.

In the positive electrode for the nonaqueous electrolyte secondary battery of the present aspect of the invention, it is essential that the surface of particles of cobalt-based lithium composite oxide represented by a general formula: $Li_aCO_{1-s}M1_sO_2$ is coated with particles of lithium nickel cobalt manganese oxide represented by a general formula: $Li_bNi_tCO_uMn_vO_2$. Since though cobalt-based lithium composite oxide is reacted with the electrolyte to be rapidly deteriorated at a high charging voltage of around 4.5 V based on lithium, lithium nickel cobalt manganese oxide is stable under the condition of higher temperatures and higher voltages, by coating the surface of cobalt-based lithium composite oxide with lithium nickel cobalt manganese oxide, such a disadvantage that cobalt-based lithium composite oxide is rapidly deteriorated can be compensated.

Therefore, by using the positive electrode for the nonaqueous electrolyte secondary battery of the present aspect of the invention, since even when the battery is preserved in a charged state at high temperatures, the reaction between the electrolyte and the positive electrode active material becomes more slow as compared with a related-art example of the battery, the dissolution of different metal ions from cobalt-based lithium composite oxide into the electrolyte becomes small, so that the retention rate of the capacity (capacity retention rate) becomes high. Moreover, by using the positive electrode for the nonaqueous electrolyte secondary battery of the present aspect of the invention, for example in a combination with a negative electrode using a carbonaceous material as the negative electrode active material, a nonaqueous electrolyte secondary battery capable of being stably charged at a high charging voltage of 4.3 V or more and 4.5 V or less (the final positive electrode charging voltage is 4.4 V or more and 4.6 V or less based on lithium) can be obtained, so that a nonaqueous electrolyte secondary battery having high capacity and high energy density can be obtained.

In the positive electrode for the nonaqueous electrolyte secondary battery of the present aspect of the invention, it is necessary that the ratio $r_1/r_2$ of the average particle diameter $r_1$ of cobalt-based lithium composite oxide particle and the average particle diameter $r_2$ of lithium nickel cobalt manganese oxide particle is $2 \leq r_1/r_2 \leq 50$ and the average particle diameter $r_2$ of lithium nickel cobalt manganese oxide particle is 0.5 µm$\leq r_2 \leq$20 µm. When $r_1/r_2$ is less than 2, during the charge retention of the battery at high temperatures, the amount of Co ions dissolved from cobalt-based lithium composite oxide is increased and when $r_1/r_2$ is more than 50, during the charge retention of the battery at high temperatures, the amount of Ni ions, Co ions, Mn ions dissolved from lithium nickel cobalt manganese oxide is increased, so that as a result, the total amount of dissolved ions is increased and consequently, the capacity retention rate is lowered, which is not preferred.

However, even when the condition of $2 \leq r_1/r_2 \leq 50$ is satisfied, when $r_2$ is less than 0.5 µm, during the charge retention of the battery at high temperatures, the amount of Ni ions, Co ions, Mn ions dissolved from lithium nickel cobalt manganese oxide is increased, and when $r_2$ is more than 20 µm, during the charge retention of the battery at high temperatures, the amount of Co ions dissolved from cobalt-based lithium composite oxide is increased, so that as a result, the total amount of dissolved ions is increased and consequently, the charge retention rate is lowered, which is not preferred. Accordingly, in the positive electrode for the nonaqueous electrolyte secondary battery of the present aspect of the invention, it is necessary that the both conditions of $2 \leq r_1/r_2 \leq 50$ and of 0.5 µm$\leq r_2 \leq$20 µm are simultaneously satisfied. Further, since by using two types of particles having average particle diameters different from each other as described above, the packing density of the positive electrode active material can be enhanced, as a result, a nonaqueous electrolyte secondary battery in which the capacity and energy density are enhanced can be obtained.

Further, in the positive electrode for the nonaqueous electrolyte secondary battery of the present aspect of the invention, by adding Mg and Al in lithium cobalt oxide, the phase transition of the crystal structure can be suppressed and the thermal stability can be enhanced. Further, by adding Zr and Ti, the dissolution of cobalt can be suppressed and the discharging performance can be improved. However, the charging/discharging capacity tends to decrease in conjunction with an increase in the added amount of these different metal elements, whereby the advantage of lithium cobalt oxide having high capacity is lost. Thus, the total added amount s of Mg, Al, Zr and Ti as different metals M1 is preferably $0.01 \leq s \leq 0.05$.

In the positive electrode for the nonaqueous electrolyte secondary battery of the present aspect of the invention, it is preferred that the M1 be homogeneously dispersed in the cobalt-based lithium composite oxide, and Ni, Co and Mn be homogeneously dispersed in the lithium nickel cobalt manganese oxide.

When these elements respectively are homogeneously dispersed, a region in which a reaction between the positive electrode active material and the electrolyte liquid is likely to be caused locally, is unlikely to be caused, so that the deterioration of the battery properties becomes smaller.

A production method of a positive electrode for a nonaqueous electrolyte secondary battery according to another aspect of the invention includes: preparing particles of cobalt-based lithium composite oxide represented by a general formula: $Li_aCO_{1-s}M1_sO_2$ (where $0 \leq a \leq 1.1$, $0.01 \leq s \leq 0.05$, M1 contains at least one of Mg, Al, Zr, and Ti) in which a different metal element is homogeneously dispersed; preparing particles of lithium nickel cobalt manganese oxide represented by a general formula: $Li_bNi_tCO_uMn_vO_2$ (where composition ratios are $0 \leq b \leq 1.2$, $0.1 \leq t \leq 0.5$, $u \geq 0$, $0.1 \leq v \leq 0.5$) in which Ni, Co and Mn are homogeneously dispersed (with proviso that a ratio $r_1/r_2$ of an average particle diameter $r_1$ of the cobalt-based lithium composite oxide and an average particle diameter $r_2$ of the lithium nickel cobalt manganese oxide is $2 \leq r_1/r_2 \leq 50$, and the average particle diameter $r_2$ of the lithium nickel cobalt manganese oxide particle is 0.5 µm$\leq r_2 \leq$20 µm); obtaining a positive electrode active material in which the surface of the cobalt-based lithium composite oxide is coated with the lithium nickel cobalt manganese oxide by dry-mixing the cobalt-based lithium composite oxide and the lithium nickel cobalt manganese oxide by applying a pressure and a shearing force; obtaining a positive electrode mixture by adding a binder and a conductive agent to the positive electrode active material and by wet-mixing the resultant mixture; and applying the positive electrode mixture to a surface of a positive electrode current collector and drying and compressing the resultant positive electrode current collector.

According to the production method of a positive electrode for a nonaqueous electrolyte secondary battery of the present aspect of the invention, a positive electrode for the nonaqueous electrolyte secondary battery capable of exhibiting easily the above effect of the invention can be produced.

In the production method of a positive electrode for a nonaqueous electrolyte secondary battery of the present aspect of the invention, it is preferred that the cobalt-based lithium composite oxide be synthesized by subjecting a cobalt composite to which at least one of Mg, Al, Zr, and Ti is added by coprecipitating and a lithium compound to thermolysis in the presence of oxygen, and the lithium nickel cobalt manganese oxide be synthesized by subjecting a compound obtained by coprecipitating Ni, Co and Mn and a lithium compound to thermolysis in the presence of oxygen.

Thus, since various dissolved ions are homogeneously present in an aqueous solution, a precipitation in which each component is homogeneously dispersed by coprecipitating can be obtained. Accordingly, by subjecting a cobalt composite to which at least one of Mg, Al, Zr, and Ti is added by coprecipitating and a lithium composite to thermolysis in the presence of oxygen, cobalt-based lithium composite oxide in which at least one of Mg, Al, Zr, and Ti is homogeneously dispersed can be synthesized. Likewise, by subjecting a compound obtained by coprecipitating Ni, Co and Mn and a lithium compound to thermolysis in the presence of oxygen, lithium nickel cobalt manganese oxide in which Ni, Co and Mn are homogeneously dispersed can be synthesized.

According to some aspects of the invention, as described more specifically hereinafter referring to various Embodiments and Comparative Examples, a nonaqueous electrolyte secondary battery in which thermal stability and cycle performance at high temperatures are remarkably improved without the lowering of the battery capacity, can be obtained.

BRIEF DESCRIPTION OF THE DRAWINGS

The invention will be described with reference to the accompanying drawing, wherein like numbers reference like elements.

DESCRIPTION OF EXEMPLARY EMBODIMENTS

Figure 1:
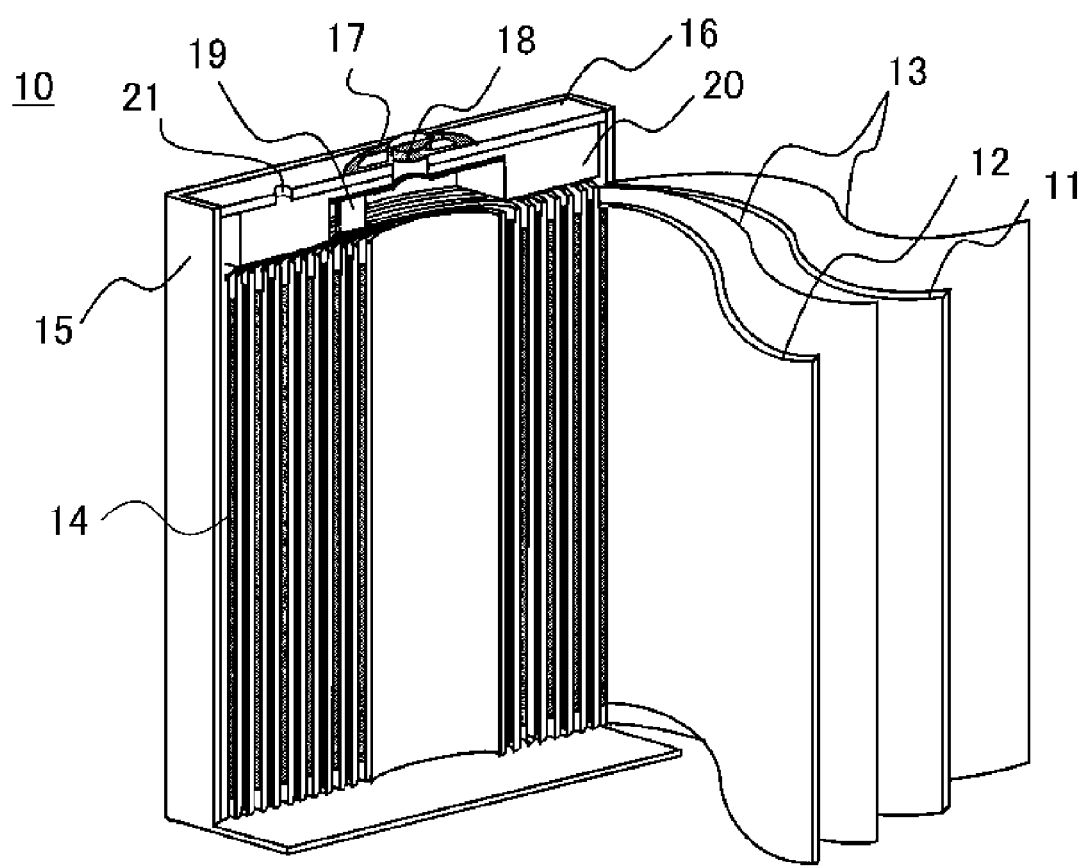
FIG. 1 is a perspective view showing a prismatic nonaqueous electrolyte secondary battery by sectioning the battery perpendicularly.

Hereinafter, exemplary embodiments for carrying out the invention are described more specifically referring to various Embodiments and Comparatives Examples. However, the following Embodiments illustrate only examples of the nonaqueous electrolyte secondary batteries for embodying the technical concept of the invention and it is not intended that the invention is specified to these Embodiments, so that the invention can be equally applied also to various modifications without departing from the technical concept shown in the appended claims.

First to Eighth Embodiments

First, specific production methods of the nonaqueous electrolyte secondary batteries used in the First to Eighth Embodiments are described.
Preparation of Positive Electrode Active Material For preparing cobalt-based lithium composite oxide, with respect to the starting material, as a lithium source, lithium carbonate ($Li_2CO_3$) was used and as a cobalt source, different metal elements-added tricobalt tetraoxide ($Co_3O_4$) was used. Among them, as different metal elements-added tricobalt tetraoxide, used was different metal elements-added cobalt carbonate produced by a method including: adding an acid aqueous solution containing respectively predetermined concentrations of magnesium (Mg), aluminum (Al), zirconium (Zr), and titanium (Ti) as different metal elements to an acid aqueous solution of cobalt, and mixing the resultant mixture; and precipitating cobalt carbonate ($CoCO_3$) and simultaneously coprecipitating magnesium, aluminum, zirconium, and titanium by adding sodium hydrogen carbonate ($NaHCO_3$) to the above mixture.

Since various ions are homogeneously mixed in the aqueous solution before adding sodium hydrogen carbonate, magnesium, aluminum, zirconium, and titanium are homogeneously dispersed in the obtained precipitation of different metal elements-added cobalt carbonate. Thereafter, this different metal elements-added cobalt carbonate was subjected to a thermal decomposition reaction in the presence of oxygen to obtain different metal elements-added tri-cobalt tetraoxide as a starting material of cobalt source in which magnesium, aluminum, zirconium, and titanium are contained homogeneously by the coprecipitation.

Next, lithium carbonate prepared as a starting material of lithium source and the different metal elements-added tricobalt tetra-oxide were weighed so that the mixing ratio thereof became a predetermined mixing ratio, and were mixed in a mortar. Thereafter, the resultant mixture was sintered at 850° C. in an air atmosphere for 20 hours to obtain cobalt-based lithium composite oxide to which magnesium, aluminum, zirconium, and titanium were added. Thereafter, by grinding this sintered cobalt-based lithium composite oxide, the first positive electrode active material composed of a cobalt-based lithium composite oxide represented by a molecular formula: $LiCo_{0.97}Al_{0.01}Mg_{0.01}Zr_{0.01}O_2$ (corresponding to s=0.03) and having a predetermined average particle diameter shown in the following Tables 1 to 3 respectively, was obtained.

Further, for preparing lithium nickel cobalt manganese oxide, with respect to the starting material, as a lithium source, lithium carbonate was used and as a nickel-cobalt-manganese source, used was nickel-cobalt-manganese compound hydroxide prepared by reacting an aqueous solution of a mixture of nickel sulfate ($NiSO_4$), cobalt sulfate ($CoSO_4$), and manganese sulfate ($MnSO_4$) with an alkali aqueous solution and by coprecipitating them.

Then, lithium carbonate prepared as a starting material of the lithium source and the nickel-cobalt-manganese compound hydroxide were weighed so that the mixing ratio became a predetermined ratio and mixed in a mortar. Thereafter, the resultant mixture was sintered in an air atmosphere at 900° C. for 15 hours to obtain lithium nickel cobalt manganese oxide. By grinding this sintered lithium nickel cobalt manganese oxide, the second positive electrode active material composed of lithium nickel cobalt manganese oxide represented by a molecular formula: $LiNi_{0.33}Co_{0.33}Mn_{0.34}O_2$ having average particle diameters respectively shown in the following Tables 1 to 4 was obtained.

By a method including: weighing the first positive electrode active material composed of cobalt-based lithium composite oxide obtained as described above and the second positive electrode active material composed of lithium nickel cobalt manganese oxide, for example in a mass ratio of 70:30; and dry-mixing them while applying an pressure and a shearing force to them to coat the surface of cobalt-based lithium composite oxide with lithium nickel cobalt manganese oxide, the positive electrode active material according to First to Eighth Embodiments was obtained.

Thereafter, this positive electrode active material (to become 85 parts by mass), a carbon powder as a conductive agent (to become 10 parts by mass), and a polyvinylidene fluoride (PVdF) powder as a binder (to become 5 parts by mass) were mixed to prepare the positive electrode mixture and this positive electrode mixture was wet-mixed with an N-methylpyrrolidone (NMP) solution to prepare a slurry. The slurry was applied to both surfaces of an aluminum-made positive electrode current collector having a thickness of 15 μm by a doctor blade method. Thereafter, the positive electrode current collector was dried and compressed using a compression roller to a thickness of 150 μm to prepare the positive electrode according to First to Eighth Embodiments having a short side length of 32 mm and a long side length of 450 mm.
Preparation of Negative Electrode A natural graphite powder (to become 95 parts by mass) and a PVdF powder (to become 5 parts by mass) were mixed and the resultant mixture was mixed with an NMP solution to prepare a slurry. The slurry was applied to both surfaces of a copper-made negative electrode current collector having a thickness of 15 μm by a doctor blade method to form an active material mixture layer on both surfaces of the negative electrode current collector. Thereafter, the negative electrode current collector was dried and compressed using a compression roller to a thickness of 145 μm to prepare a negative electrode having a short side length of 35 mm and a long side length of 480 mm. The potential of graphite is 0.1 V based on Li during the charging. The active material packed amounts of the positive and negative electrodes were prepared such that at a potential of the positive electrode active material which is a design criterion, the charging capacity ratio between the positive and negative electrodes (negative electrode charging capacity/positive electrode charging capacity) becomes 1.15.

Preparation of Electrode Assembly

By winding the positive and negative electrodes that has been prepared as described above and between which a separator composed of a polyethylene-made fine porous film was interposed in a cylindrical shape and by crushing the resultant electrode assembly, a flat and spiral electrode body was prepared.

Preparation of Electrolyte

In a mixed solvent of EC (30 vol %) and DEC (70 vol %), $LiPF_6$ was dissolved such that the concentration thereof becomes 1 mol/L to prepare a nonaqueous electrolyte and the electrolyte was subjected to the preparation of the battery.

Preparation of Batteries

By inserting the electrode assembly prepared as described above into a prismatic outer can (55×35×40 mm), by pouring the above electrolyte liquid thereinto and by sealing an opening of the prismatic outer can, the batteries according to the First to Eighth Embodiments were prepared. The designed capacity of the nonaqueous electrolyte secondary batteries produced according to the First to Eighth Embodiments was 800 mAh.

Ninth and Tenth Embodiments

Next, the specific production methods of the nonaqueous electrolyte secondary batteries used in the Ninth and Tenth Embodiments are described. The nonaqueous electrolyte secondary battery of the Ninth Embodiment was prepared in substantially the same manner as in the First to Eighth Embodiments, except that the first positive electrode active material composed of cobalt-based lithium composite oxide represented by a molecular formula: $LiCO_{0.99}Al_{0.01}O_2$ (corresponding to s=0.01) and having an average particle diameter of 13.1 μm, was used. Further, the nonaqueous electrolyte secondary battery of the Tenth Embodiment was prepared in substantially the same manner as in the First to Eighth Embodiments, except that the first positive electrode active material composed of cobalt-based lithium composite oxide represented by a molecular formula: $LiCO_{0.95}Al_{0.02}Mg_{0.01}Zr_{0.01}Ti_{0.01}O_2$ (corresponding to s=0.05) and having an average particle diameter of 12.8 μm, was used.

Next, the specific production methods of the nonaqueous electrolyte secondary batteries used in the First to Ninth Comparative Examples are described.

First Comparative Example

The nonaqueous electrolyte secondary battery of the First Comparative Example was prepared in substantially the same manner as in the First to Eighth Embodiments, except that the positive electrode active material prepared by weighing the first positive electrode active material (to become 70 parts by mass) composed of cobalt-based lithium composite oxide represented by a molecular formula: $LiCo_{0.97}Al_{0.01}Mg_{0.01}Zr_{0.01}O_2$ (corresponding to s=0.03) and having an average particle diameter of 14.3 μm, by weighing the second positive electrode active material (to become 30 parts by mass) composed of lithium nickel cobalt manganese oxide represented by a molecular formula: $LiNi_{0.33}CO_{0.33}Mn_{0.34}O_2$ and having an average particle diameter of 5.8 μm, and by wet-mixing the two positive electrode active materials in an NMP solution, was used.

Second Comparative Example

The nonaqueous electrolyte secondary battery of the Second Comparative Example was prepared in substantially the same manner as in the First to Eighth Embodiments, except that as the positive electrode active material, only the first positive electrode active material composed of cobalt-based lithium composite oxide (produced as described above) represented by a molecular formula: $LiCo_{0.97}Al_{0.01}Mg_{0.01}Zr_{0.01}O_2$ (corresponding to s=0.03) and having an average particle diameter of 14.3 μm, was used.

Third Comparative Example

The nonaqueous electrolyte secondary battery of the Third Comparative Example was prepared in substantially the same manner as in the First to Eighth Embodiments, except that as the positive electrode active material, only the second positive electrode active material composed of lithium nickel cobalt manganese oxide (produced as described above) represented by a molecular formula: $LiNi_{0.33}Co_{0.33}Mn_{0.34}O_2$ and having an average particle diameter of 5.8 μm, was used.

Fourth to Seventh Comparative Examples

The nonaqueous electrolyte secondary batteries of the Fourth to Seventh Comparative Examples were prepared in substantially the same manner as in the First to Eighth Embodiments, except that the average particle diameters of the first positive electrode active material composed of cobalt-based lithium composite oxide (produced as described above) represented by a molecular formula: $LiCo_{0.97}Al_{0.01}Mg_{0.01}Zr_{0.01}O_2$ (corresponding to s=0.03) and the second positive electrode active material composed of lithium nickel cobalt manganese oxide (produced as described above) represented by a molecular formula: $LiNi_{0.33}CO_{0.33}Mn_{0.34}O_2$ were respectively varied as shown in Table 3.

Eighth and Ninth Comparative Examples

The nonaqueous electrolyte secondary battery of the Eighth Comparative Example was prepared in substantially the same manner as in the First to Eighth Embodiments, except that as cobalt-based lithium composite oxide, $LiCoO_2$ was used. Further, the nonaqueous electrolyte secondary battery of the Ninth Comparative Example was prepared in substantially the same manner as in the First to Eighth Embodiments, except that the first positive electrode active material composed of cobalt-based lithium composite oxide represented by a molecular formula: $LiCo_{0.94}Al_{0.02}Mg_{0.02}Zr_{0.01}Ti_{0.01}O_2$ (corresponding to s=0.06) and having an average particle diameter of 13.7 μm, was used.

Next, the measuring methods of various battery properties of the nonaqueous electrolyte secondary batteries common to the First to Tenth Embodiments and the First to Ninth Comparative Examples, are described.

Measurement of Initial Discharging Capacity

With respect to each of the batteries prepared as described above according to the First to Tenth Embodiments and the First to Ninth Comparative Examples, each battery was charged at 25° C. using a constant current of 1 It=800 mA and after the battery voltage reached 4.4 V, each battery was initially charged until the charging current value reached 16 mA, while maintaining the battery voltage at 4.4 V. Thereafter, the initially-charged battery was discharged using a constant current of 1 It until the battery voltage reached 2.75 V to measure the discharging capacity at this time as the initial discharging capacity.

Measurement of Amount of Metal Ion Dissolved from Positive Electrode into Electrolyte during Charge Retention at High Temperatures With respect to each of the batteries prepared as described above according to the First to Tenth Embodiments and the First to Ninth Comparative Examples, each battery was charged at 25° C. using a constant current of 1 It=800 mA and after the battery voltage reached 4.4 V, each battery was charged until the charging current value reached 16 mA, while maintaining the battery voltage at 4.4 V. Then, the battery was preserved at 80° C. for 48 hours. Thereafter, the battery was taken apart in a dry box in an Argon atmosphere and the electrolyte liquid was recovered to analyze the amount of metal ions dissolved from the positive electrode and contained in the electrolyte according to an ICP (inductivity coupled plasma) emission spectrometry. As metal ions, ions of cobalt (Co), nickel (Ni), and manganese (Mn) were measured. As the amount of dissolved metal ions (ppm), the total amount (g) of cobalt, nickel, and manganese per 1 g of the positive electrode active material and per 1 g of the electrolyte was measured.

Measurement of High Temperature Charge Retention Characteristics

With respect to each of the batteries prepared as described above according to the First to Tenth Embodiments and the First to Ninth Comparative Examples, each battery was charged at 25° C. using a constant current of 1 It=800 mA and after the battery voltage reached 4.4 V, each battery was charged until the charging current value reached 16 mA, while maintaining the battery voltage at 4.4 V. Thereafter, the battery was discharged using a constant current 1 It until the battery voltage reached 2.75 V to measure the discharging capacity at this time as a prepreservation capacity. Thereafter, the battery was charged again using a constant current 1 It and after the battery voltage reached 4.4 V, each battery was charged until the charging current value reached 16 mA, while maintaining the battery voltage at 4.4 V. Then, the battery was preserved at 80° C. for 48 hours. Thereafter, the battery was discharged using a constant current of 1 It until the voltage reached 2.75 V to measure the discharging capacity at this time as a postpreservation capacity. Then, as an index for the high temperature charge retention characteristics, the capacity retention rate (%) was calculated according to the following equation:

Capacity retention rate(%)=(postpreservation capacity/prepreservation capacity)×100.

With respect to the results obtained as described above, the results of the First Embodiment and the First Comparative Example are summarized in Table 1; the results of the Second and Third Comparative Examples are summarized in Table 2; the results of the First to Eighth Embodiments and the Fourth to Seventh Comparative Examples are summarized in Table 3 in the particle diameter ratio ($r_1/r_2$) increasing order; and the results of the First, Ninth, and Tenth Embodiments and the Eighth and Ninth Comparative Examples are summarized in Table 4.

TABLE 1

| | Cobalt-based lithium composite oxide Average particle diameter $r_1$ (μm) | Lithium nickel cobalt manganese oxide Average particle diameter $r_2$ (μm) | Particle diameter ratio ($r_1/r_2$) | Coating treatment | Initial discharge capacity (mAh) | High temp. charge retention characteristics Metal ion dissolved amount (ppm) | Capacity retention rate (%) |
|---|---|---|---|---|---|---|---|
| Embodiment 1 | 14.3 | 5.8 | 2.5 | Yes | 822 | 156 | 83.2 |
| Comparative 2 | 14.3 | 5.8 | 2.5 | No | 820 | 335 | 74.5 |

Cobalt-based lithium lithium composite oxide: $LiCo_{0.9}Al_{0.001}Mg_{0.01}Zr_{0.01}O_2$ Lithium nickel cobalt manganese oxide: $LiNi_{0.3}Co_{0.3}Mn_{0.34}O_2$ Table 1 shows the results of a case where the surface of a first positive electrode active material having a larger average particle diameter was coated with a second positive electrode active material having a smaller average particle diameter (First Embodiment) and a case where the two were only mixed (First Comparative Example). From the results shown in Table 1, it is apparent that the initial discharging capacities of the two were substantially the same as each other, however, in the high temperature charge retention test, not only was the amount of metal ions dissolved from the positive electrode in the battery of the First Embodiment largely suppressed in comparison with that in the battery of the First Comparative Example, but also the capacity retention rate of the battery of the First Embodiment was larger than that of the battery of the Third Comparative Example. Accordingly, it can be considered that by coating the surface of a first positive electrode active material having a larger average particle diameter with a second positive electrode active material having a smaller average particle diameter, under a condition of high temperatures, a structural deterioration of the positive electrode could be suppressed and also, the thermal stability thereof could be improved.

TABLE 2

| | Cobalt-based lithium composite oxide Average particle diameter $r_1$ (μm) | Lithium nickel cobalt manganese oxide Average particle diameter $r_2$ (μm) | Particle diameter ratio ($r_1/r_2$) | Initial discharge capacity (mAh) | High temp. charge retention characteristics | |
|---|---|---|---|---|---|---|
| | | | | | Metal ion dissolved amount (ppm) | Capacity retention rate (%) |
| Comparative 2 | 14.3 | — | — | 816 | 523 | 65.9 |
| Comparative 3 | — | 5.8 | — | 696 | 118 | 85.7 |

Cobalt-based lithium composite oxide: $LiCo_{0.97}Al_{0.01}Mg_{0.01}Zr_{0.01}O_2$
Lithium nickel cobalt manganese oxide: $LiNi_{0.33}Co_{0.33}Nb_{0.34}O_2$ Table 2 shows the test results of the simple substance of the first positive electrode active material composed of cobalt-based lithium composite oxide having a large average particle diameter (Second Comparative Example) and of the simple substance of the second positive electrode active material composed of lithium nickel cobalt manganese oxide having a small average particle diameter (Third Comparative Example), respectively. With respect to the simple substance of cobalt-based lithium composite oxide, the amount of dissolved metal ions during the high temperature charge retention was large and the capacity retention rate was low. With respect to the simple substance of lithium nickel cobalt manganese oxide, though the amount of dissolved metal ions during the high temperature charge retention was small and the capacity retention rate was high, since the packing density of lithium nickel cobalt manganese oxide are poor, the initial discharging capacity thereof was markedly lower.

TABLE 3

| | Cobalt-based lithium composite oxide Average particle diameter $r_1$ (μm) | Lithium nickel cobalt manganese oxide Average particle diameter $r_2$ (μm) | Particle diameter ratio ($r_1/r_2$) | Initial discharge capacity (mAh) | High temp. charge retention characteristics | |
|---|---|---|---|---|---|---|
| | | | | | Metal ion dissolved amount (ppm) | Capacity retention rate (%) |
| Comparative 4 | 14.3 | 10.1 | 1.4 | 803 | 456 | 70.5 |
| Embodiment 2 | 32.6 | 16.3 | 2.0 | 811 | 276 | 78.5 |
| Comparative 5 | 48.3 | 21.8 | 2.2 | 805 | 489 | 69.5 |
| Embodiment 3 | 48.3 | 20.0 | 2.4 | 800 | 293 | 78.8 |
| Embodiment 1 | 14.3 | 5.8 | 2.5 | 822 | 156 | 83.2 |
| Embodiment 4 | 32.6 | 10.1 | 3.2 | 801 | 226 | 81.0 |
| Embodiment 5 | 14.3 | 1.4 | 10.2 | 807 | 141 | 82.8 |
| Embodiment 6 | 32.6 | 1.4 | 23.3 | 812 | 189 | 81.0 |
| Embodiment 7 | 14.3 | 0.5 | 28.6 | 801 | 298 | 78.3 |
| Comparative 6 | 14.3 | 0.3 | 47.7 | 803 | 419 | 70.6 |
| Embodiment 8 | 35.0 | 0.7 | 50.0 | 809 | 264 | 79.6 |
| Comparative 7 | 48.3 | 0.7 | 69.0 | 805 | 488 | 68.3 |

Cobalt-based lithium composite oxide: $LiCo_{0.97}Al_{0.01}Mg_{0.01}Zr_{0.01}O_2$
Lithium nickel cobalt manganese oxide: $LiNi_{0.33}Co_{0.33}Mn_{0.34}O_2$ Table 3 shows the test results of the case where the particle diameter ratio between the first positive electrode active material composed of cobalt-based lithium composite oxide and the second positive electrode active material composed of lithium nickel cobalt manganese oxide, was varied. As is apparent from the description of Table 3, when the average particle diameter ratio ($r_1/r_2$) is $2 \leq r_1/r_2 \leq 50$, except the cases of the Fifth and Sixth Comparative Examples, in the high temperature charge retention test, the amount of dissolved metal ions was small and the capacity retention rate was high.

When the results of the Third Embodiment and the Fifth Comparative Example are compared with each other, in the both, the average particle diameters $r_1$ of the first positive electrode active material composed of cobalt-based lithium composite oxide were the same as each other and were 48.3 μm. However, in the Fifth Comparative Example in which the average particle diameter $r_2$ of the second positive electrode active material composed of lithium nickel cobalt manganese oxide was larger than that in the Third Embodiment, the amount of dissolved metal ions was substantially larger and the capacity retention rate was lower than those in the Third Embodiment.

Since the second positive electrode active material composed of lithium nickel cobalt manganese oxide is coated on the surface of the first positive electrode active material composed of cobalt-based lithium composite oxide, originally a positive electrode active material having a smaller average particle diameter $r_2$ should impart better coating performance. However, it is considered that since in the Fifth Comparative Example, the average particle diameter $r_2$ of the second positive electrode active material was larger than that in the Third Embodiment, the coating was unsatisfactory, which led to an impairment of the high temperature charge retention characteristics. Therefore, it can be confirmed that a preferred maximum value of the average particle diameter $r_2$ of the second positive electrode active material composed of lithium nickel cobalt manganese oxide is 20 μm.

Further, when the results of the Seventh Embodiment and the Sixth Comparative Example are compared with each other, in the both, the average particle diameters $r_1$ of the first positive electrode active material composed of cobalt-based lithium composite oxide were the same as each other and were 14.3 μm. However, in the Sixth Comparative Example in which the average particle diameter $r_2$ of the second positive electrode active material composed of lithium nickel cobalt manganese oxide was smaller than that in the Seventh Embodiment, the amount of dissolved metal ions was substantially larger and the capacity retention rate was lower than those in the Seventh Embodiment.

It is considered that the above phenomenon was because, originally, a second positive electrode active material composed of lithium nickel cobalt manganese oxide having a smaller average particle diameter $r_2$ should exhibit better coating characteristics, however, when the average particle diameter $r_2$ is too small, the reactivity of the positive electrode active material with the electrolyte becomes large, so that the amount of dissolved metal ions became large. Therefore, it can be confirmed that a preferred minimum value of the average particle diameter $r_2$ of the second positive electrode active material composed of lithium nickel cobalt manganese oxide is 0.5 μm.

Thus, summing up the results shown in Table 3, it is apparent that since in the case of both $r_1/r_2<2$ and $r_1/r_2>50$, the amount of dissolved metal ions and the capacity retention rate during the high temperature charge retention were both impaired, the optimal condition is the case where both $2 \leq r_1/r_2 \leq 50$ and $0.5 \ \mu m \leq r_2 \leq 20 \ \mu m$ are simultaneously satisfied.

Further, the above First to Tenth Embodiments show the case where as the second positive electrode active material composed of lithium nickel cobalt manganese oxide, that represented by $LiNi_{0.33}Co_{0.33}Mn_{0.34}O_2$ was used. However, the invention is not limited to this lithium nickel cobalt manganese oxide, but so long as a lithium nickel cobalt manganese oxide is represented by $Li_bNi_tCo_uMn_vO_2$ (composition ratio: $0 \leq b \leq 1.2$, $0.1 \leq t \leq 0.5$, $u \geq 0$, $0.1 \leq v \leq 0.5$), such a lithium nickel cobalt manganese oxide can be equally used.

Further, the above First to Tenth Embodiments show the test results of the case where the contents of cobalt-based lithium composite oxide and lithium nickel cobalt manganese oxide in the mass ratio was 70:30. However, in the invention, since when the content of cobalt-based lithium composite oxide is small, the initial discharging capacity is decreased and when the content of lithium nickel cobalt manganese oxide is small, the thermal stability is lowered, it is preferred that the contents of cobalt-based lithium composite oxide and lithium nickel cobalt manganese oxide in the mass ratio be in the range of 70:30 to 80:20.

TABLE 4

| | Cobalt-based lithium composite oxide | s | Average particle diameter $r_1$ (μm) | Lithium nickel cobalt manganese oxide Average particle diameter $r_2$ (μm) | Particle diameter ratio ($r_1/r_2$) | Initial discharge capacity (mAh) | High temp. charge retention characteristics Metal ion dissolved amount (ppm) | Capacity retention rate (%) |
|---|---|---|---|---|---|---|---|---|
| Comparative 8 | $LiCoO_2$ | 0 | 13.5 | 5.8 | 2.3 | 828 | 249 | 76.8 |
| Embodiment 9 | $LiCo_{0.99}Al_{0.01}O_2$ | 0.01 | 13.1 | 5.8 | 2.3 | 820 | 168 | 81.5 |
| Embodiment 1 | $LiCo_{0.97}Al_{0.01}Mg_{0.01}Zr_{0.01}O_2$ | 0.03 | 14.3 | 5.8 | 2.5 | 822 | 156 | 83.2 |
| Embodiment 10 | $LiCo_{0.95}Al_{0.02}Mg_{0.01}Zr_{0.01}Ti_{0.01}O_2$ | 0.05 | 12.8 | 5.8 | 2.2 | 810 | 153 | 83.0 |
| Comparative 9 | $LiCo_{0.94}Al_{0.02}Mg_{0.02}Zr_{0.01}Ti_{0.01}O_2$ | 0.06 | 13.7 | 5.8 | 2.4 | 789 | 149 | 82.7 |

Lithium nickel cobalt manganese oxide: $LiNi_{0.33}Co_{0.33}Mn_{0.34}O_2$

Table 4 shows the test results of the case where the composition of the first positive electrode active material composed of cobalt-based lithium composite oxide was varied. When the amount s of different elements added to lithium cobalt oxide was $0.01 \leq s \leq 0.05$, the amount of dissolved metal ions in the high temperature charge retention test result was decreased and the capacity retention rate was improved. However, in the case where lithium cobalt oxide to which no different metal element was coprecipitation-added which corresponds to s=0 (Eighth Comparative Example), though an advantageous result of the initial discharging capacity was obtained, the high temperature charge retention test result was impaired. It is considered that it is because the reactivity between the positive electrode active material and the electrolyte was not suppressed. Further, in the case where the amount s of the added different metal elements was s=0.06 (Ninth Comparative Example), though the high temperature charge retention test result was advantageous, the initial discharging capacity was decreased. It is considered that this is because the added amount of different metal elements which did not participate in the electrode reaction was too large and consequently, a relative content of lithium cobalt oxide which participated directly in the electrode reaction became smaller, which led to the decrease of the initial discharging capacity. Thus, from the results shown in Table 4, it is apparent that the amount s of added different elements is optimally $0.01 \leq s \leq 0.05$.

What is claimed is:

1. A production method of a positive electrode for a nonaqueous electrolyte secondary battery, the production method comprising:
    preparing particles of cobalt-based lithium composite oxide represented by a general formula: $Li_aCO_{1-s}M1_sO_2$ (where $0<a \leq 1.1$, $0.01 \leq s \leq 0.05$, M1 contains at least one of Mg, Al, Zr, and Ti) in which a different metal element M1 is homogeneously dispersed;
    preparing particles of lithium nickel cobalt manganese oxide represented by a general formula: $Li_bNi_tCo_uMn_vO_2$ (where composition ratios are $0<b \leq 1.2$, $0.1 \leq t \leq 0.5$, $u \geq 0$, $0.1 \leq v \leq 0.5$) in which Ni, Co and Mn are homogeneously dispersed (with proviso that a ratio $r_1/r_2$ of an average particle diameter $r_1$ of the cobalt-based lithium composite oxide and an average particle diameter $r_2$ of the lithium nickel cobalt manganese oxide is $2 \leq r_1/r_2 \leq 50$, and the average particle diameter $r_2$ of the lithium nickel cobalt manganese oxide particle is $0.5 \ \mu m \leq r_2 \leq 20 \ \mu m$);
    obtaining a positive electrode active material in which the surface of the cobalt-based lithium composite oxide is coated with the lithium nickel cobalt manganese oxide by dry-mixing the cobalt-based lithium composite oxide and the lithium nickel cobalt manganese oxide by applying a pressure and a shearing force;
    obtaining a positive electrode mixture by adding a binder and a conductive agent to the positive electrode active material and by wet-mixing the resultant mixture; and applying the positive electrode mixture to a surface of a positive electrode current collector, and drying and compressing the resultant positive electrode current collector.

2. The production method of a positive electrode for a nonaqueous electrolyte secondary battery according to claim 1, wherein the cobalt-based lithium composite oxide is synthesized by subjecting a cobalt composite to which at least one of Mg, Al, Zr, and Ti is added by coprecipitating and a lithium compound to thermolysis in the presence of oxygen, and the lithium nickel cobalt manganese oxide is synthesized by subjecting a compound obtained by coprecipitating Ni, Co and Mn and a lithium compound to thermolysis in the presence of oxygen.

* * * * *